United States Patent [19]

Dufour et al.

[11] Patent Number: 4,854,689

[45] Date of Patent: Aug. 8, 1989

[54] PROGRESSIVE OPHTHALMIC LENS

[75] Inventors: Maurice Dufour, Paris; Gérard Obrecht, Issy Les Moulineaux, both of France

[73] Assignee: Essilor International Compagnie Generale d'Optique, Creteil, France

[21] Appl. No.: 916,748

[22] Filed: Oct. 8, 1986

[30] Foreign Application Priority Data

Oct. 23, 1985 [FR] France .................. 85 15726

[51] Int. Cl.$^4$ .............................................. G02C 7/06
[52] U.S. Cl. ..................................... 351/169; 351/168
[58] Field of Search ....................... 351/169, 168, 161

[56] References Cited

U.S. PATENT DOCUMENTS

| 2,878,721 | 3/1959 | Kanolt | 351/169 |
| 3,687,528 | 8/1972 | Maitenaz | 351/169 |
| 4,240,719 | 12/1980 | Guilino et al. | 351/169 |
| 4,362,368 | 12/1982 | Ligten | 351/169 |
| 4,640,593 | 2/1987 | Shinohara | 351/169 |

FOREIGN PATENT DOCUMENTS

| 219767 | 1/1959 | Australia | 351/169 |
| 2533708 | 3/1984 | European Pat. Off. | |
| 1159286 | 6/1958 | France . | |
| 2020847 | 11/1979 | United Kingdom . | |
| 2058391 | 4/1981 | United Kingdom . | |
| 2128361 | 4/1984 | United Kingdom . | |
| 2162964 | 2/1986 | United Kingdom . | |

OTHER PUBLICATIONS

Treatise of Optical Instruments, "Optical Combinations-Practice of Calculations", Revue D'Optique Theorique et Instrumentale, Paris, 1967, by Jean Burcher, pp. 72–74.

Primary Examiner—Bruce Y. Arnold
Assistant Examiner—Ronald M. Kachmarik
Attorney, Agent, or Firm—Charles E. Brown; Charles A. Brown

[57] ABSTRACT

A progressive ophthalmic lens with a continuous progressive surface comprises a substantially constant power first area matched to far vision. It also has a substantially constant power second area matched to near vision. Between the first and second areas is a progressively varying power third area. This is defined by a central part extending to both sides of the main progression meridian. In this central area each line on the progressive surface parallel to the main progression meridian substantially satisfies at every point the following equation:

$$1/R1 - 1/R2 = \text{constant}$$

wherein R1 and R2 are the principal radii of the surface at the point concerned.

5 Claims, 2 Drawing Sheets

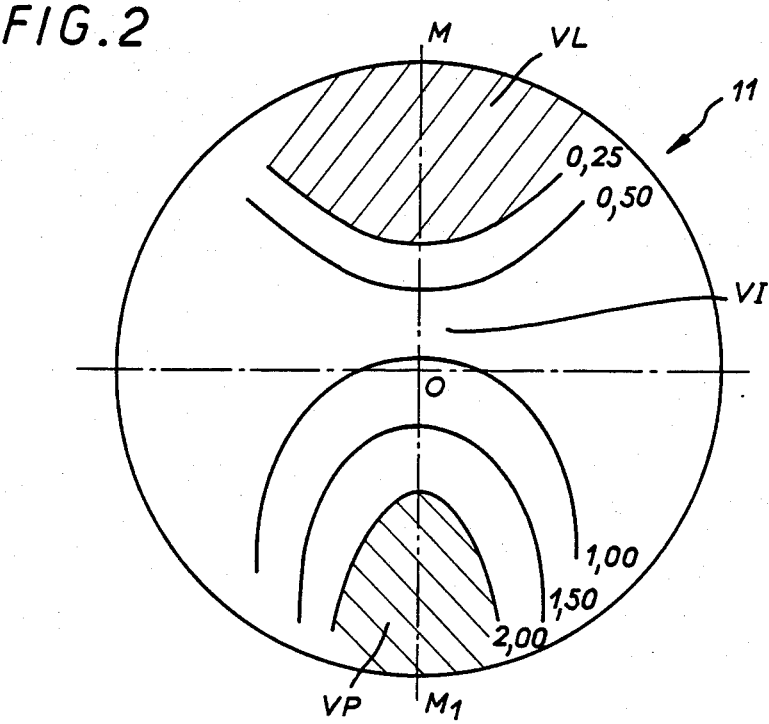
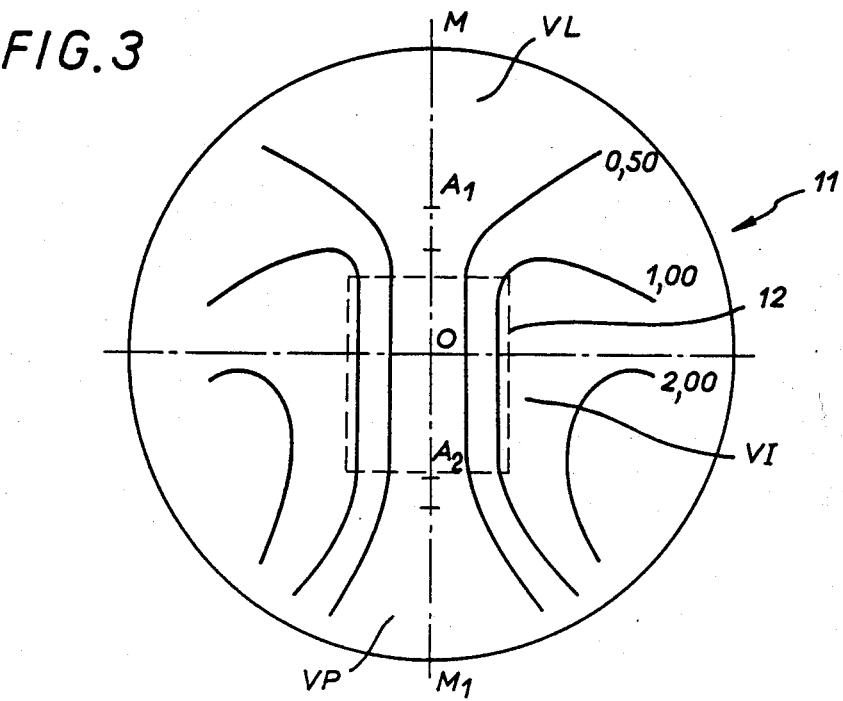

PROGRESSIVE OPHTHALMIC LENS

BACKGROUND OF THE INVENTION

1. Field of the Invention

The present invention concerns a progressive ophthalmic lens and is more particularly concerned with the configuration of the progressive area of this type of lens.

2. Description of the Prior Art

Progressive ophthalmic lenses designed to compensate for accommodation defects of the crystalline lens comprise in the known way a substantially constant power first area for far vision, a substantially constant power second area for near vision and between these two areas a third area of progressively varying focal power merging with the first two areas continuously.

The various known progressive lenses represent a compromise between various parameters, the most important of which include the length and the law of progression, the distribution of powers, the reduction of distortion and the adaptation to binocular vision.

However, none of the known lenses attempts to optimize the progression corridor that is formed by the central part of the progressive area to either side of the main progression meridian, in other words to confer on this progression corridor a width and optical characteristics such that the person wearing the lenses can use any area within the corridor for continuous, or in other words permanent viewing of objects situated at a distance intermediate far vision and near vision.

The present invention is directed to a progressive ophthalmic lens meeting this condition in particular.

SUMMARY OF THE INVENTION

The present invention consists in a progressive ophthalmic lens with a continuous progressive surface comprising a substantially constant power first area matched to far vision, a substantially constant power second area matched to near vision and a progressively variable power third area between said first and second areas defined by a central part extending to both sides of the main progression meridian and in which each line on the progressive surface parallel to said main progression meridian substantially satisfies at every point the equation $$1/R1 - 1/R2 = \text{constant}$$

where R1 and R2 are the principal radii of the surface at the point concerned.

Also, in the manner that is known per se, the main progression meridian is substantially umbilical, meaning that at each point on it the principal radii are substantially equal.

In this way the ophthalmic lens in accordance with the invention can satisfy most requirements of progressive lens wearers and in particular the situation where these have to observe for long periods an object situated at an intermediate distance, such as a computer visual display unit screen, for example.

The characteristics and advantages of the invention will be better understood from the following description given with reference to the accompanying drawings.

BRIEF DESCRIPTION OF THE DRAWINGS

FIG. 2 shows the lens itself on which are represented the areas of substantially constant power and the curves of equal power (in diopters) of the progressive surface.

FIG. 3 is a view analogous to FIG. 2 showing the curves of equal astigmatism (in diopters).

DESCRIPTION OF THE PREFERRED EMBODIMENT

A progressive ophthalmic lens comprises two refractive surfaces, one of which is concave and generally part-spherical or in the shape of some other surface of revolution and the other of which is convex and has a continuous surface at least one area on which features progressively varying curvature.

The present invention is equally applicable to concave and convex surfaces.

The lens shown in the accompanying diagrams has a diameter of 60 millimeters.

Referring to FIG. 2 in particular, the progressive lens 11 in accordance with the invention has a substantially constant power first area VL matched to far vision. In the example described the power P of this area VL is nil (0 diopters).

The lens 11 comprises a substantially constant power second area VP matched to near vision, with a power of 2 diopters in the example shown.

In the usual way the area VL is in the upper part of the lens 11 and the area VP is in the lower part.

As shown here, the progressive surface of the lens 11 is preferably symmetrical relative to the main progression meridian curve MM1.

Figure 1:
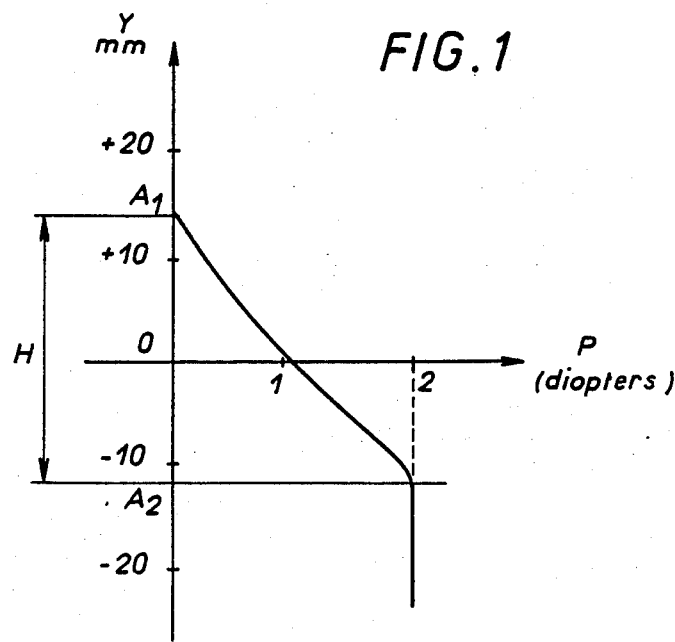
FIG. 1 is a graph showing the variation in power along the main progression meridian of a progressive ophthalmic lens in accordance with the invention.
Figure 4:
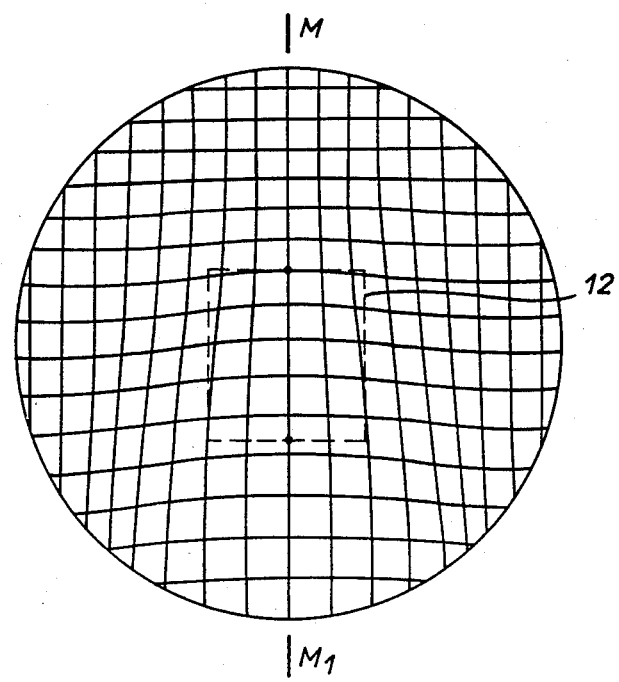
FIG. 4 shows the image of a regular grid of square mesh transmitted by the progressive lens in accordance with the invention.

Between the first and second areas VL and VP is a third area VI the power of which varies continuously from 0 to 2 diopters along MM1 from A1 to A2, as shown in FIG. 1, in which merges continuously with the areas VL and VP.

The curves of equal power expressed in diopters in FIG. 2 show the distribution of power in this third area VI.

Finally, in accordance with the invention there is defined within this third area VI a central part 12 shown in dashed outline in FIG. 3 and which extends symmetrically to either side of the main meridian MM1 along the y-axis over a width of at least 15 millimeters and over a height at least equal to three quarters of the total progression height H, in which central part 12 each line on the progressive surface parallel to the main meridian MM1 substantially satisfies at every point the known equation:

$$1/R1 - 1/R2 = \text{constant}$$

where R1 and R2 are the principal radii of the surface at the point concerned with R1 being along one axis and R2 being along a second axis normal to the one axis. The one axis may be the x-axis and the second axis the y-axis.

In other words, and as shown in FIG. 3, in the central part 12 of the third area VI the lines of equal astigmatism on the progressive surface are parallel to the main meridian MM1.

With each line parallel to the main meridian MMI, as illustrated in FIG. 3, the power of astigmatism is equal or constant along the length of the line. This is true for each point lying along a particular line parallel to the main meridian. Since the astigmatism is constant, each point along the length of the particular line will be of equal or constant astigmatism. Each point along a particular parallel line will satisfy the above equation. For each parallel line on a symmetrical half of the central part 12, there is a different constant of astigmatism.

This characteristic of the central part 12 of the progressive area VI makes it possible to provide the lens 11 with a wide progression corridor usable at any intermediate distance for long and continuous periods by a wearer whilst providing far and near vision areas sufficiently large for normal everyday use of the lens.

It is to be understood that the present invention is not limited to the embodiment described and shown but encompasses any variant execution.

There is claimed:

1. A progressive ophthalmic lens with a continuous progressive surface comprising a substantially constant power first area matched to far vision, a substantially constant power second area matched to near vision and a progressively variable power third area between said first and second areas defined by a central part extending to both sides of the main progression meridian, said central part having lines parallel to said main progression meridian, and each of said parallel lines being of constant astigmatism along its' length, the overall width of said central part being at least 15 millimeters, and said main progression meridian being substantially umbilical wherein, at each point on it, the principal radii are substantially equal.

2. Ophthalmic lens according to claim 1, wherein said central part is substantially symmetrical relative to said main progression meridian.

3. Ophthalmic lens according to claim 1, wherein the height of said central part is at least three quarters the progression height between said first and second areas.

4. Ophthalmic lens according to claim 1, wherein every point along a respective parallel line of said central part has a constant astigmatism equivalent to the constant astigmatism of said respective line, and every point is defined as the principal radii of the surface at the point concerned along first and second axes.

5. Ophthalmic lens according to claim 4 wherein said one axis is an x-axis and said second axis is a y-axis.

* * * * *